US011083996B2

(12) United States Patent
Difrancesco et al.

(10) Patent No.: US 11,083,996 B2
(45) Date of Patent: Aug. 10, 2021

(54) SCR CATALYST MODULES AND ASSOCIATED CATALYTIC REACTORS (71) Applicant: Cormetech, Inc., Durham, NC (US)

(72) Inventors: Chris E. Difrancesco, Durham, NC (US); Christian Trefzger, Durham, NC (US); Josh Andreas, Durham, NC (US); Colby Burtt, Hillsborough, NC (US)

(73) Assignee: CORMETECH, INC., Durham, NC (US)

( * ) Notice: Subject to any disclaimer, the term of this patent is extended or adjusted under 35 U.S.C. 154(b) by 45 days.

(21) Appl. No.: 16/468,843

(22) PCT Filed: Dec. 12, 2017

(86) PCT No.: PCT/US2017/065713
§ 371 (c)(1),
(2) Date: Jun. 12, 2019

(87) PCT Pub. No.: WO2018/111811
PCT Pub. Date: Jun. 21, 2018

(65) Prior Publication Data
US 2020/0078732 A1    Mar. 12, 2020

Related U.S. Application Data (60) Provisional application No. 62/433,035, filed on Dec. 12, 2016.

(51) Int. Cl.
*B01J 21/04* (2006.01)
*B01J 21/06* (2006.01)
(Continued)

(52) U.S. Cl.
CPC ...... *B01D 53/8631* (2013.01); *B01J 35/0026* (2013.01); *B01J 35/04* (2013.01); *B01D 2255/9202* (2013.01)

(58) Field of Classification Search
CPC ........ B01J 35/0026; B01J 35/04; B01J 21/04; B01J 21/06; B01J 21/063; B01J 21/066;
(Continued)

(56) References Cited

U.S. PATENT DOCUMENTS 4,127,691 A * 11/1978 Frost ................. B01J 35/04
428/116
4,840,827 A * 6/1989 Mizutani ............ B01D 53/86
156/89.22

(Continued)

OTHER PUBLICATIONS

International Search Report and Written Opinion corresponding to PCT/US2017/065713, dated Feb. 21, 2018, 8 pages.

(Continued)

*Primary Examiner* — Cam N. Nguyen
(74) *Attorney, Agent, or Firm* — J. Clinton Wimbish; Nexsen Pruet, PLLC (57) ABSTRACT In one aspect, catalyst modules are described herein comprises structural catalyst bodies having cross-sectional flow channel geometries and surface features for enhanced catalytic activity. In some embodiments, the catalyst modules and associated structural catalyst bodies are suitable for use in high particulate matter environments. Briefly, a catalyst module comprises a framework and a plurality of structural catalyst bodies positioned in the framework, a structural catalyst body comprising an outer peripheral wall and a plurality of inner partition walls forming individual flow channels of rectangular cross-section, the outer peripheral wall resistant to localized flexural failures induced by material between adjacent structural catalyst bodies of the module.

16 Claims, 7 Drawing Sheets (51) Int. Cl.
  *B01J 21/08* (2006.01)
  *B01J 23/22* (2006.01)
  *B01J 23/24* (2006.01)
  *B01J 23/28* (2006.01)
  *B01J 23/30* (2006.01)
  *B01J 23/36* (2006.01)
  *B01J 23/40* (2006.01)
  *B01J 23/42* (2006.01)
  *B01J 23/46* (2006.01)
  *B01J 35/00* (2006.01)
  *B01J 35/04* (2006.01)
  *B01D 53/86* (2006.01)

(58) Field of Classification Search
  CPC ... B01J 21/08; B01J 23/22; B01J 23/24; B01J 23/28; B01J 23/30; B01J 23/36; B01J 23/40; B01J 23/42; B01J 23/44; B01J 23/46
  See application file for complete search history.

(56) References Cited

U.S. PATENT DOCUMENTS

| | | | |
|---|---|---|---|
| 5,494,881 A * | 2/1996 | Machida | F01N 3/2828 502/439 |
| 5,676,912 A | 10/1997 | Sharma et al. | |
| 5,866,080 A * | 2/1999 | Day | F01N 3/2828 422/180 |
| 7,776,786 B2 * | 8/2010 | DiFrancesco | B01D 53/8631 502/439 |
| 7,807,110 B2 * | 10/2010 | DiFrancesco | B01J 35/04 422/180 |
| 8,277,737 B2 * | 10/2012 | DiFrancesco | B01J 35/04 422/180 |
| 8,901,033 B2 * | 12/2014 | Trefzger | B01J 35/0073 502/439 |
| 9,675,934 B2 * | 6/2017 | Difrancesco | B01J 35/04 |
| 9,957,200 B2 * | 5/2018 | Beall | B01D 46/2418 |
| 2004/0081848 A1 | 4/2004 | Hijikata | |
| 2004/0166035 A1 | 8/2004 | Noda et al. | |
| 2005/0180898 A1 | 8/2005 | Yamada | |
| 2005/0255021 A1 | 11/2005 | Difrancesco et al. | |
| 2005/0276734 A1 | 12/2005 | Schirmer et al. | |
| 2008/0311340 A1 | 12/2008 | Kasai et al. | |
| 2009/0246453 A1 * | 10/2009 | Yamaguchi | B01D 46/2455 428/116 |
| 2013/0344283 A1 | 12/2013 | Sakamoto et al. | |
| 2015/0079334 A1 * | 3/2015 | Trefzger | B01J 23/30 428/117 |
| 2015/0209726 A1 | 7/2015 | Difrancesco et al. | |
| 2019/0247790 A1 * | 8/2019 | Difrancesco | B01D 53/9431 |

OTHER PUBLICATIONS

Aluminum Oxide (Al2O3) Properties, Accuratus, Aug. 31, 2009, [retrieved on Jan. 24, 2018], Retrieved from the Internet: <URL: http://accuratus.com/alumox.html>; p. 2.

* cited by examiner

SCR CATALYST MODULES AND ASSOCIATED CATALYTIC REACTORS

RELATED APPLICATION DATA

This application is a U.S. National Phase of PCT/US2017/065713, filed Dec. 12, 2017, which claims priority pursuant to 35 U.S.C. § 119(e) to U.S. Provisional Patent Application Ser. No. 62/433,035 filed Dec. 12, 2016, each of which is incorporated herein by reference in their entireties.

FIELD

The present invention relates to modules comprising honeycomb catalytic bodies for the selective catalytic reduction (SCR) of nitrogen oxides and, in particular, to module comprising honeycomb catalytic bodies employing flow channels of rectangular cross-section.

BACKGROUND

The high toxicity of nitrogen oxides and their role in the formation of acid rain and tropospheric ozone have resulted in the imposition of strict standards limiting the discharges of these chemical species. To meet these standards, it is generally necessary to remove at least part of these oxides present in the exhaust gases from stationary or mobile combustion sources. Denitration or selective catalytic reduction (SCR) technology is commonly applied to combustion-derived flue gases for removal of nitrogen oxides. The denitration reaction comprises the reaction of nitrogen oxide species in the gases, such as nitrogen oxide (NO) or nitrogen dioxide ($NO_2$), with a nitrogen containing reductant, such as ammonia or urea, resulting in the production of diatomic nitrogen ($N_2$) and water.

In addition to nitrogen oxides, sulfur dioxide ($SO_2$) is a chemical species often present in combustion-flue gases that causes great environmental concern. Sulfur dioxide that is present in fossil fuel combustion flue-gases is partly oxidized to sulfur trioxide ($SO_3$) which reacts with water to form sulfuric acid. The formation of sulfuric acid from the oxidation of sulfur dioxide in combustion flue-gases can increase corrosion problems in downstream equipment, can increase power costs associated with air pre-heaters due to the increased temperature required to keep the acid-containing flue-gas above its dew point, and can cause increased opacity in the stack gases emitted to the atmosphere.

Catalyst systems for the removal of nitrogen oxides can increase the amount of sulfur dioxide oxidation since the catalytic material utilized in selective catalytic reduction can additionally effectuate the oxidation of sulfur dioxide. As a result, the reduction in the nitrogen oxide content of a combustion flue-gas can have an undesirable side-effect of increasing $SO_3$ formation in the combustion flue-gas.

Combustion flue-gases containing nitrogen oxides and a significant sulfur dioxide content are commonly produced from the combustion of coal. Coal-fired combustion flue-gases contain high amounts of particulate matter, especially in the form of ash. This particulate matter has the ability to clog the cells of a monolithic structural catalyst body resulting in a reduced catalytic performance and efficiency. Individual ash particles alone can plug catalyst cells or ash particles can aggregate to produce a plug. Moreover, smaller particulate matter can plug catalytic pores located within inner partition walls of the catalyst body.

SUMMARY

In one aspect, catalyst modules are described herein comprises structural catalyst bodies having cross-sectional flow channel geometries and surface features for enhanced catalytic activity. In some embodiments, the catalyst modules and associated structural catalyst bodies are suitable for use in high particulate matter environments. Briefly, a catalyst module comprises a framework and a plurality of structural catalyst bodies positioned in the framework, a structural catalyst body comprising an outer peripheral wall and a plurality of inner partition walls forming individual flow channels of rectangular cross-section. The outer peripheral wall and inner partition walls have dispersed throughout a chemical composition comprising 50-99.9 weight percent an inorganic oxide composition and at least 0.1 weight percent a catalytically active metal functional group. Inner partition walls intersect the outer peripheral wall to define segments of the outer peripheral wall greater than 10 mm in length, wherein the segments exhibit flexural strength ($\sigma$) of at least 2.5 MPa. When excised from the structural catalyst body, an outer peripheral wall segment exhibits flexural strength ($\sigma'$) of at least 0.7 MPa. The intersecting inner partition walls forming flow channels with the outer peripheral wall segments are at least 20 percent shorter in length than the segments. Structural catalyst bodies of the module can have a flow channel density less than 1.5 $cm^{-2}$ and/or an areal weight density of less than 1200 $g/m^2$.

The catalyst module also comprises a compressible matting material. The compressible matting material can be positioned between adjacent structural catalyst bodies, thereby separating the catalyst bodies and sealing interfaces between the catalyst bodies. In some embodiments, the structural catalyst bodies are surrounded by the matting material. Alternatively, the compressible matting material can be positioned between the module framework and structural catalyst bodies adjacent to the module framework. In further embodiments, the compressible matting material separates adjacent structural catalyst bodies and is also positioned between the module framework and structural catalyst bodies. The matting material can have a minimum thickness of 1.5 mm. Moreover, the matting material can exhibit Young modulus less than 1 GPa under compression between structural catalyst bodies. In some embodiments, the matting material can be replaced by a fluid material such as cement.

These and other embodiments are described in greater detail in the detailed description which follows.

DETAILED DESCRIPTION

The present invention can be understood more readily by reference to the following detailed description, examples and drawings and their previous and following descriptions. Elements, apparatus and methods of the present invention, however, are not limited to the specific embodiments presented in the detailed description, examples and drawings. It should be recognized that these embodiments are merely illustrative of the principles of the present invention. Numerous modifications and adaptations will be readily apparent to those of skill in the art without departing from the spirit and scope of the invention.

Figure 1:
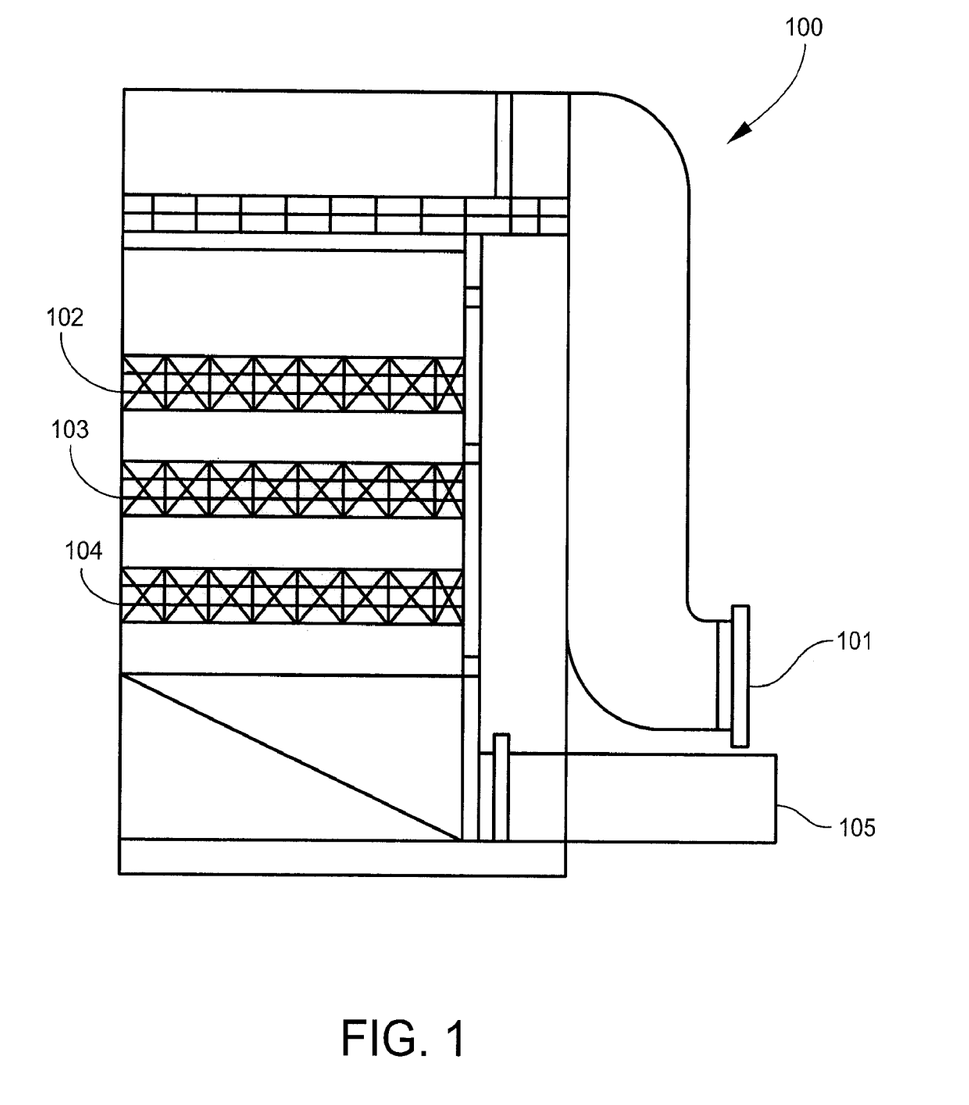
FIG. 1 illustrates a catalytic reactor according to some embodiments.

Referring now to the figures, FIG. 1 illustrates a catalytic reactor according to some embodiments described herein. Fluid streams flow into the catalytic reactor 100 through an entrance manifold 101. Once inside the catalytic reactor 100, fluid streams flow through several catalytic layers 102, 103, 104 comprising modularized sections (not shown) which contain structural catalyst bodies (not shown) that conduct catalyzed reactions within the fluid streams. After passing through the catalytic layers 102, 103, 104, fluid streams flow out of the catalytic reactor through an exit manifold 105.

Figure 2:
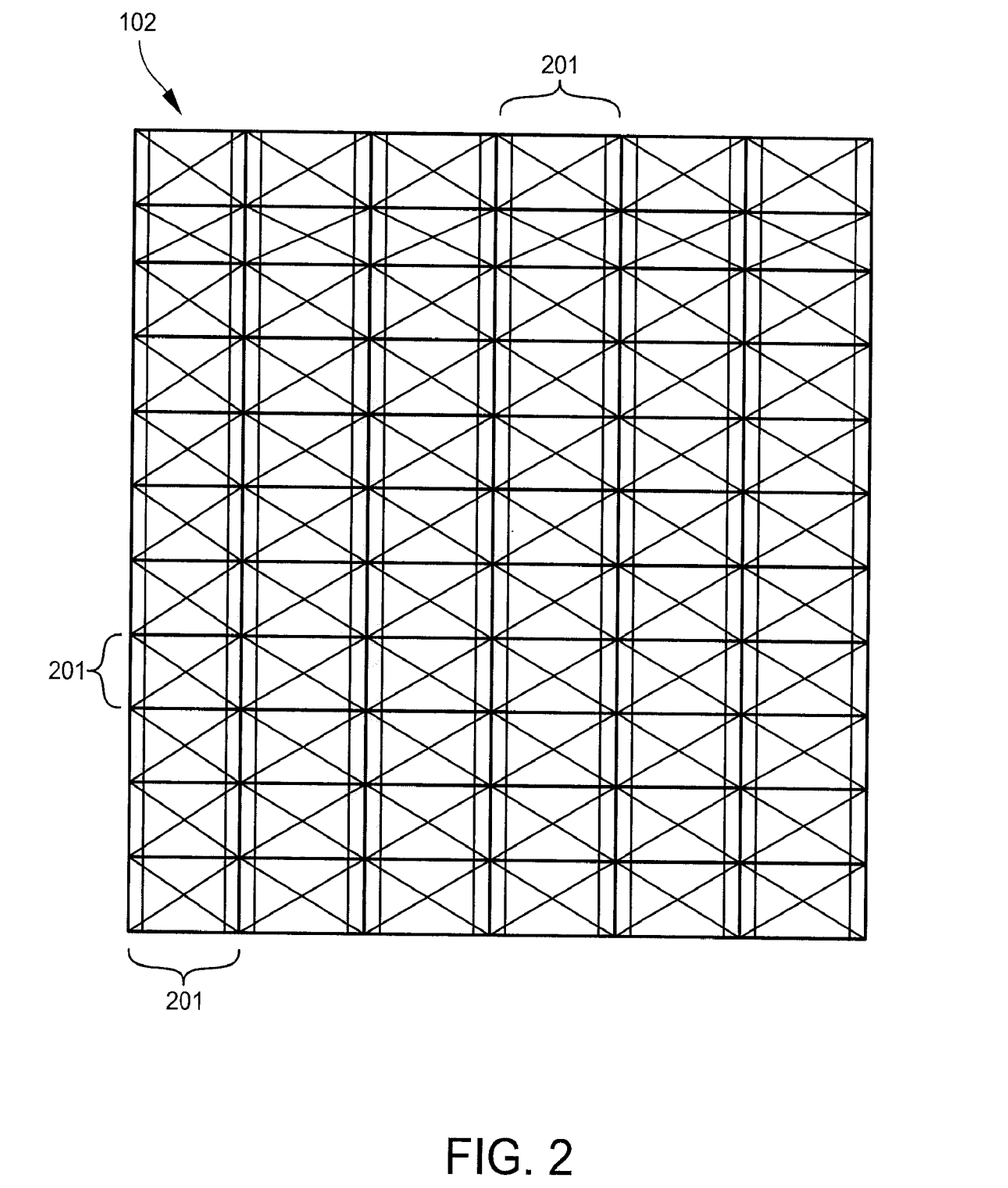
FIG. 2 illustrates a plan view of a modularized catalytic layer of a catalytic reactor according to some embodiments.
Figure 3:
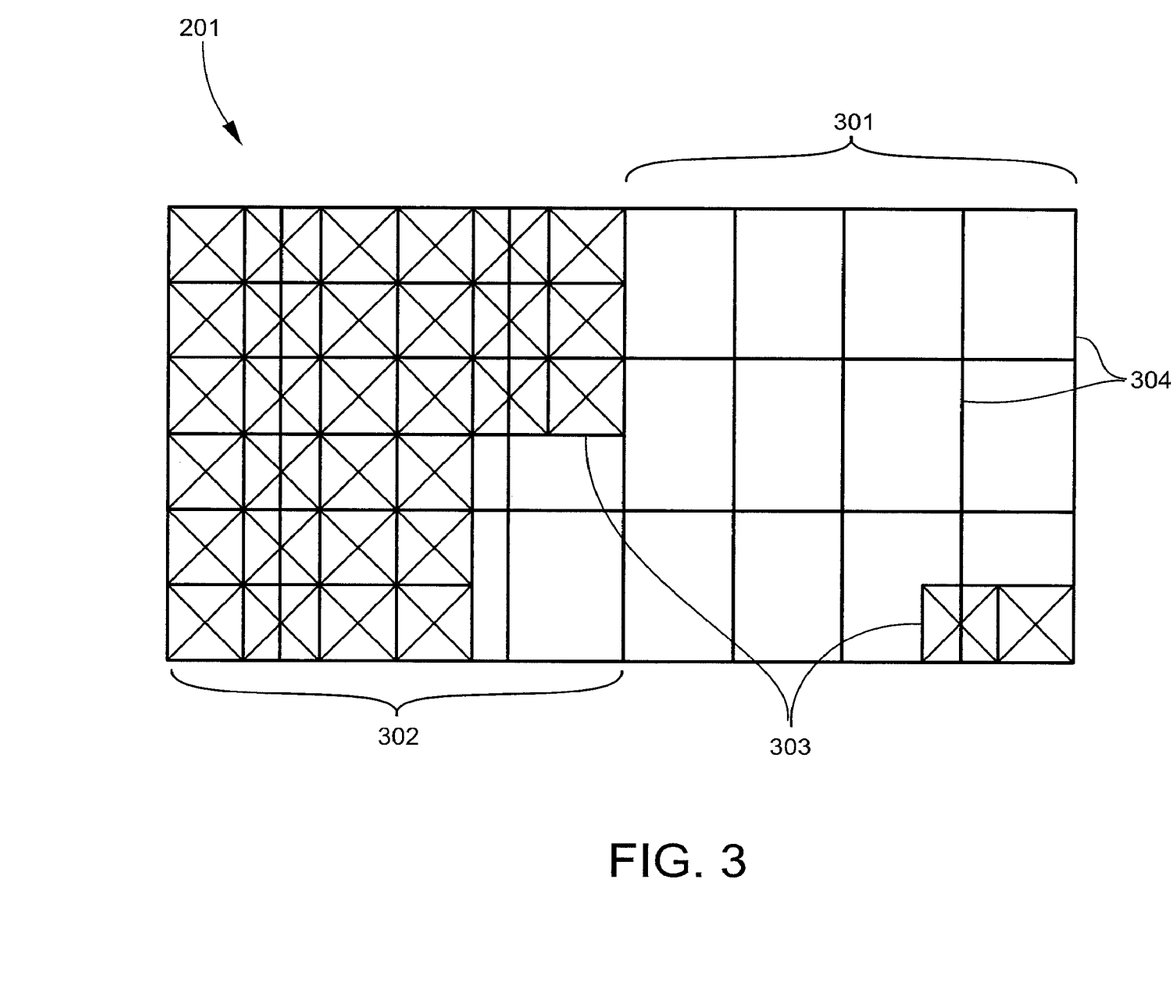
FIG. 3 illustrates an individual modularized section of a modularized catalytic layer according to some embodiments.

FIG. 2 illustrates a plan view of a modularized catalytic layer according to some embodiments. The modularized catalytic layer 102, comprises an array of modularized sections 201 which contain structural catalyst bodies (not shown) for conducting catalytic reactions in fluid streams passing through the catalytic layer 102. FIG. 3 illustrates an individual modularized section of a modularized catalytic layer according to some embodiments. The modularized section 201 comprises two sides 301, 302. Catalyst bodies 303 are inserted into the modularized section 201 and supported by the framework 304 of the modularized section. One side 302 of the modularized section 201 displayed in FIG. 3 is almost full of catalyst bodies 303 while the remaining side 301 comprises two catalyst bodies 303.

Figure 4:
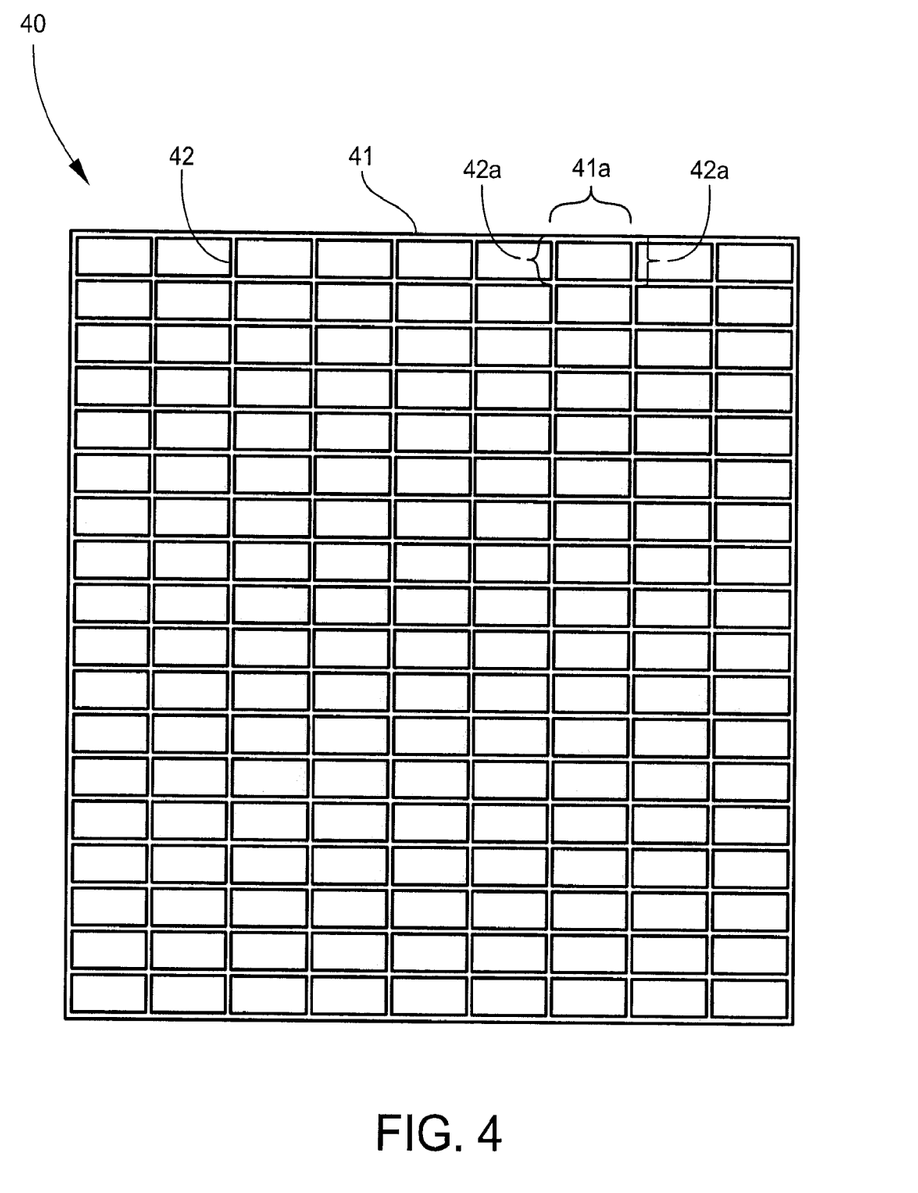
FIG. 4 illustrates an end view of a structural catalyst body according to some embodiments.
Figure 6:
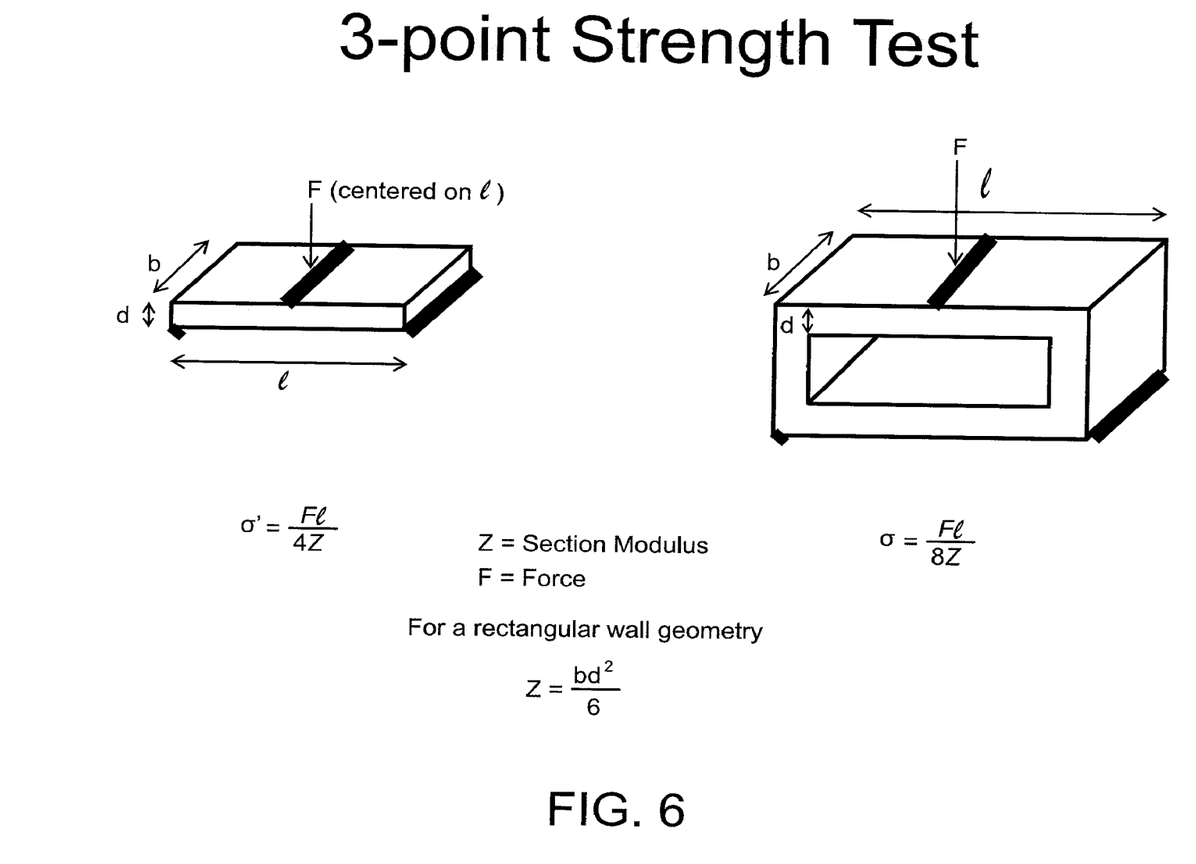
FIG. 6 illustrates methods of determining flexural strengths ($\sigma$, $\sigma'$) of an outer peripheral wall segment when the segment is part of a cell of the structural catalyst body and when excised from the structural catalyst body.

FIG. 4 illustrates an end view of a structural catalyst body according to some embodiments. As illustrated in FIG. 4, the structural catalyst body 40 comprises an outer peripheral wall 41 and inner partition walls 42 forming individual flow channels 43 of rectangular cross-section. The outer peripheral wall and inner partition walls have dispersed throughout a chemical composition comprising 50-99.9 weight percent an inorganic oxide composition and at least 0.1 weight percent a catalytically active metal functional group. Inner partition walls 42 intersect the outer peripheral wall 41 to define segments 41a of the outer peripheral wall greater than 10 mm in length, wherein the segments 41a exhibit flexural strength ($\sigma$) of at least 2.5 MPa. When excised from the structural catalyst body, an outer peripheral wall segment exhibits flexural strength ($\sigma'$) of at least 0.7 MPa. FIG. 6 illustrates methods of determining flexural strengths ($\sigma$, $\sigma'$) of an outer peripheral wall segment when part of a cell of the structural catalyst body and when excised from the structural catalyst body. Outer peripheral wall segments 41a, in some embodiments, have a length of at least 12 mm or at least 15 mm. Outer peripheral wall segments 41a can also have lengths selected from Table I.

TABLE I

| Outer Peripheral Wall Segment Length (mm) |
|---|
| 10-25 |
| 12-20 |
| 15-25 |
| 10-20 |

Outer peripheral wall segment 41a length can be selected according to several considerations including, but not limited to, desired flow channel pitch size and flow channel density. In some embodiments, adjacent outer peripheral wall segments 41a are of the same length or substantially the same length. As illustrated in FIG. 4, all outer peripheral wall segments 41a can be of the same length. Alternatively, length of outer peripheral wall segments 41a can vary along the perimeter of the structural catalyst body wherein at least a plurality of the segments 41a satisfy the length requirements recited herein, such as those of Table I.

Figure 5A:
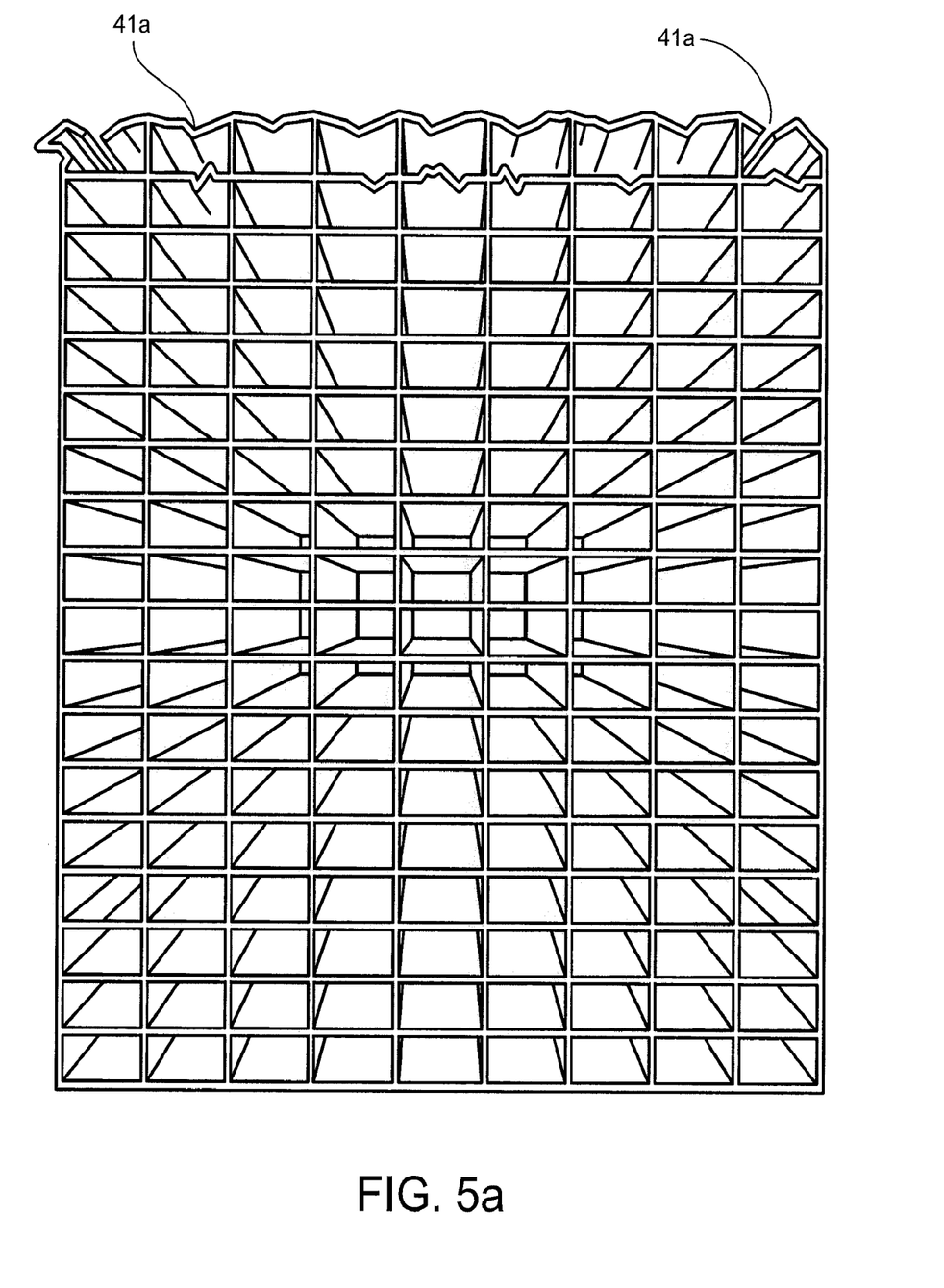
FIG. 5a illustrates failure of an outer peripheral wall segment of a structural catalyst body due to local flexural stress applied by the matting material according to some embodiments.
Figure 5B:
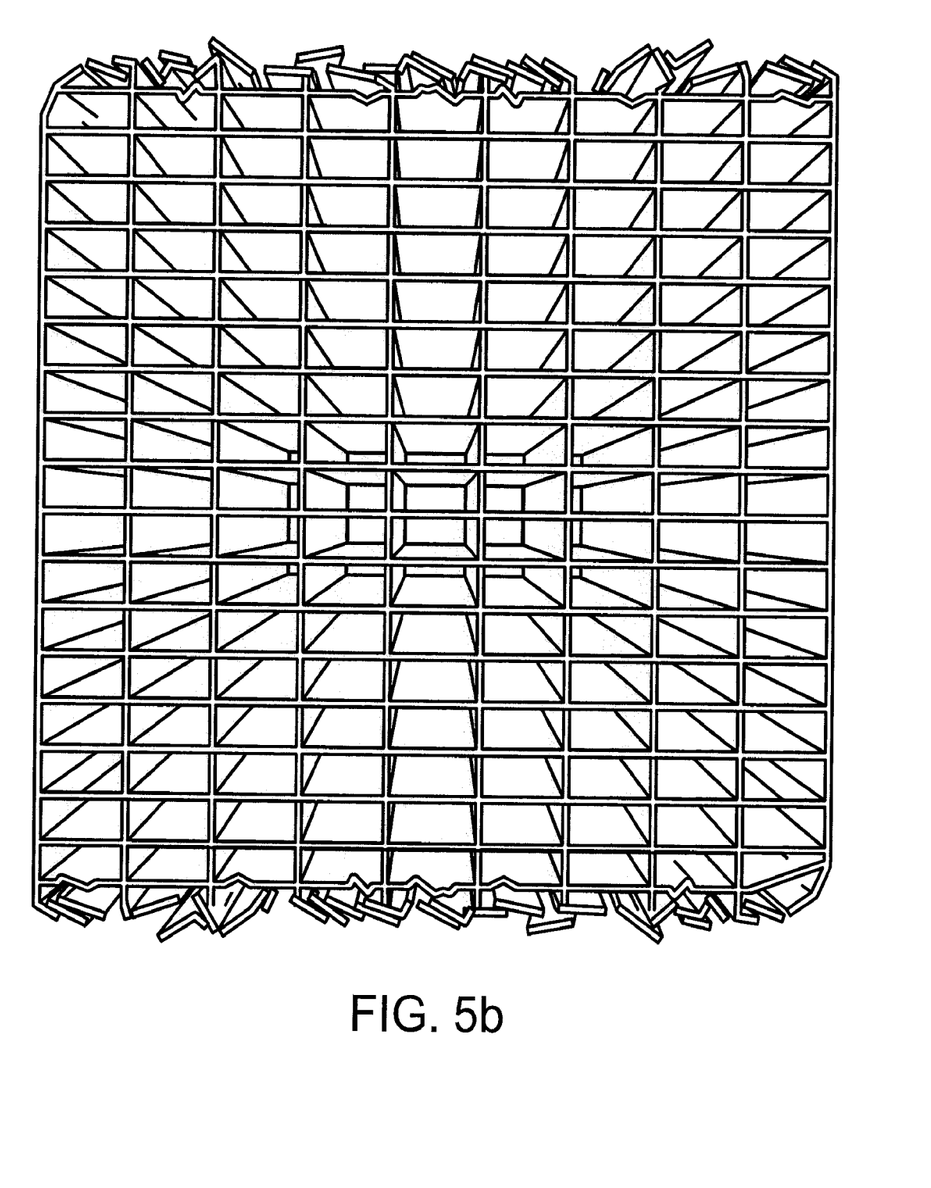
FIG. 5b illustrates total outer peripheral wall failure resulting from segment failure.

The wall segments 41a require a flexural strength of at least 2.5 MPa to resist failure due to local stresses imparted by the matting material adjacent to the outer peripheral wall. Matting material positioned between structural catalyst bodies in the module can be placed into compression due to forces required to seal around or between the bodies and/or hold the bodies in place or due to forces created by expansion and contraction of the module during heat-up or cool-down of the reactor. Compression of the matting material can induce local stresses at the outer peripheral wall segments, leading to failure of one or more segments 41a. FIG. 5a illustrates outer peripheral wall segment 41a failure according to some embodiments. Segment 41a failure can lead to outer peripheral wall collapse as illustrated in FIG. 5b. Outer peripheral wall failure can destabilize the entire structural catalyst body. In the absence of an outer peripheral wall, the inner partition walls can collapse or shear leading to catastrophic catalyst body failure. Due to the flexural strengths described herein, less than 50% of outer peripheral wall segments in a module may experience failure in some embodiments.

Referring once again to FIG. 4, the intersecting inner partition walls 42a forming flow channels with the outer peripheral wall segments 41a are at least 20 percent shorter in length than the segments 41a.

Structural catalyst bodies having features described herein can be formed of any composition not inconsistent with objectives of the present invention. In some embodiments, the outer peripheral wall and inner partition walls are formed from a support material such as an inorganic oxide composition, including refractory metal oxide compositions. The inorganic oxide composition, in some embodiments, comprises titania ($TiO_2$), alumina ($Al_2O_3$), zirconia ($ZrO_2$), silica ($SiO_2$), silicate or mixtures thereof. In some embodiments, the chemical composition comprises an inorganic oxide composition in an amount ranging from about 50 weight percent to 99.9 weight percent. In some embodiments, the inorganic oxide composition is sintered or otherwise heat treated to increase the mechanical integrity of the structural catalyst body. The structural catalyst body can also comprise at least 0.1 weight percent catalytically active metal functional group. In some embodiments, the catalytically active metal functional group includes one or more metals selected from the group consisting of vanadium, tungsten, molybdenum, platinum, palladium, ruthenium, rhodium, rhenium, iron, gold, silver, copper and nickel and alloys and oxides thereof. In some embodiments, one or more catalytic materials of structural catalyst bodies described herein are suitable for SCR applications and processes. In some embodiments, for example, catalytic material comprises $V_2O_5$, $WO_3$ or $MoO_3$ or mixtures thereof.

Structural catalyst bodies can be formed by any process operable to impart the features and properties described herein. In some embodiments, for example, structural catalyst bodies are formed by extruding an inorganic oxide composition. Rectangular cross-section of the flow channels can be provided by the extrusion process. The inorganic oxide composition can contain catalytic material or can be inert. In embodiments wherein the extruded inorganic oxide composition is inert, catalytic material can be added via impregnation and/or washcoating processes. In some embodiments, the extruded inorganic oxide composition comprises catalytic material and additional catalytic material is added via impregnation and/or washcoating processes.

The structural catalyst bodies can have any desired areal weight density not inconsistent with the objectives of the present invention. In some embodiments, structural catalyst bodies of the module have an areal weight density less than 1200 g/m². The areal catalyst weight density or mass per unit geometric surface area may be computed directly as the mass of the structural catalyst body divided by the geometric surface area of the monolithic structural catalyst body. The geometric surface area is equal to the perimeter of the flow channels times the length of the flow channels multiplied by the number of flow channels contained within the structural catalytic body. In some embodiments, a structural catalyst body can exhibit areal weight density less than 1000 g/m² or less than 800 g/m².

Moreover, structural catalyst bodies of the module can have any desired flow channel density. In some embodiments, a structural catalyst body has a flow channel density of less than 1.5 cm$^{-2}$. Flow channel density can be selected according to several considerations including, but not limited to, exhaust stream composition and flow characteristics through the modules and catalytic reactor. Flow channel density can also be less than 1.1 cm$^{-2}$ or less than 1.5 cm$^{-2}$.

In some embodiments, module and structural catalyst bodies are suitable for processing exhaust gas streams generated in coal fired applications, such as coal fired power plants. For example, the combustion gas stream can comprise greater than 1 g/Nm³ of fly ash. In other embodiments, the combustion gas stream can comprise fly ash amounts selected from Table II.

TABLE II

| Combustion Gas Stream Fly Ash (g/Nm³) |
|---|
| 5-150 |
| 20-100 |
| 50-150 |
| >20 |
| >50 |
| >80 |

Structural catalyst bodies of the module may also exhibit an open frontal area of at least 80%.

In some embodiments, structural catalyst bodies can have an erosion weight loss of less than or equal to 0.13 g. The erosion weight loss of structural catalyst bodies of the present invention is measured according to ASTM Method G76-04 "Standard Test Method for Conducting Erosion Tests by Solid Particle Impingement Using Gas Jets," conducted by a testing laboratory certified to the ISO 17025 standard "General Requirements for the Competence of Testing and Calibration Laboratories" such as Metcut Research, Inc. of Cincinnati, Ohio, wherein the ASTM procedure is modified according to (a) specification E50TF121, (b) Metcut operation procedure 740.12, (c) a compressed air stream is used to entrain 50 micron aluminum oxide solid particles of tight particle size distribution and greater than 98% purity through a 1.5 mm inner diameter nozzle in order to impinge the solid particles on the surface of the monolithic structural catalyst body sample at a controlled distance of 10 mm for a 30-second interval using a reduced air pressure of 5 psig vs. the normal pressure of 50 psig at an angle of incidence of 20 degrees, (d) the erosion weight loss test values are calibrated at least every fifth test using standard Lexan panels, and (e) the sample surface is selected so as to exclude regions of "edge hardening" such as conventionally used at the inlet region to the monolithic structural catalyst body when used in reduction of nitrogen oxides from coal-fired boilers wherein the flue gas contains erosive coal fly ash particles. The remaining steps in the ASTM procedure may be followed without alteration. Erosion weight loss values of monolithic structural catalysts are reported herein as an average taken from at least two separate tests of a sample. In other embodiments, a structural catalyst body can have an erosion weight loss of less than or equal to 0.07 g.

As described herein, matting material is positioned between structural catalyst bodies in the module and/or between the module framework and the structural catalyst bodies. In some embodiments, the matting material can seal at least 50 percent of the interfaces between adjacent structural catalyst bodies in the module. The matting material is of composition and structure sufficient to withstand thermal cycling of the module in the catalytic reactor. In some embodiments, thermal cycling includes heating to a temperature of 200° C. and cooling to a temperature of 40° C. Thermal cycling can place the matting material into compression due to expansion of the structural catalyst bodies. The matting material can exhibit Young's modulus less than 1 GPa under compression between structural catalyst bodies. For example the matting material can exhibit Young's modulus less than 1 GPa or less than 0.5 GPa at compression 10 percent of the uncompressed state. In alternative embodiments, the matting material between structural catalyst bodies can be replaced by a fluid material such as cement. In such embodiments, the compressible matting material can be positioned between the module framework and structural catalyst bodies.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A catalyst module comprising:
   a framework; and
   a plurality of structural catalyst bodies positioned in the framework with a compressible matting material positioned between the structural catalyst bodies, wherein the structural catalyst bodies comprise an outer peripheral wall and a plurality of inner partition walls forming individual flow channels of rectangular cross-section, the outer peripheral wall and inner partition walls have dispersed throughout a chemical composition comprising 50-99.9 weight percent an inorganic oxide composition and at least 0.1 weight percent a catalytically active metal functional group, wherein the inner partition walls intersect the outer peripheral wall to define segments of the outer peripheral wall greater than 10 mm in length and having flexural strength ($\sigma$) of at least 2.5 MPa, and wherein the compressible matting material has a Young's modulus less than 1 GPa under compression.

2. The catalyst module of claim 1, wherein an outer peripheral wall segment exhibits a flexural strength ($\sigma'$) of at least 0.7 MPa when excised from the structural catalyst body.

3. The catalyst module of claim 1, wherein the intersecting inner partition walls forming flow channels with the outer peripheral wall are at least 20 percent shorter than the outer peripheral wall segments.

4. The catalyst module of claim 1, wherein the structural catalyst body has a flow channel density less than 1.5 cm$^{-2}$.

5. The catalyst module of claim 1, wherein the matting material is at compression 10 percent of the uncompressed state.

6. The catalyst module of claim 1, wherein the compressible matting material separates adjacent structural catalyst bodies.

7. The catalyst module of claim 6, wherein at least 50 percent of interfaces between the structural catalyst bodies are sealed by the matting material.

8. The catalyst module of claim 1, wherein the compressible matting material is positioned between the module framework and structural catalyst bodies adjacent to the module framework.

9. The catalyst module of claim 1, wherein the module is subjected to cycling between 40° C. and 200° C. in a coal-fired SCR reactor.

10. The catalyst module of claim 1, wherein less than 50 percent of outer peripheral wall segments in the module exhibit failure.

11. The catalyst module of claim 1, wherein the outer peripheral wall segments have a length of 12-20 mm.

12. The catalyst module of claim 1, wherein the outer peripheral wall segments are of the same length.

13. The catalyst module of claim 1, wherein length of the outer peripheral wall segments varies along the structural catalyst body perimeter.

14. The catalyst module of claim 1, wherein the structural catalyst bodies have an areal weight density less than 12 g/m$^2$.

15. The catalyst module of claim 1, wherein the structural catalyst bodies have an erosion weight loss of less than or equal to 0.13 g.

16. The catalyst module of claim 1, wherein the structural catalyst bodies have an open frontal area of at least 80%.

* * * * *

UNITED STATES PATENT AND TRADEMARK OFFICE
CERTIFICATE OF CORRECTION

Page 1 of 1

PATENT NO. : 11,083,996 B2
APPLICATION NO. : 16/468843
DATED : August 10, 2021
INVENTOR(S) : Chris E. Difrancesco et al.

It is certified that error appears in the above-identified patent and that said Letters Patent is hereby corrected as shown below:

In the Claims

Column 7, Line 2, Claim 1, the number "10" should be deleted.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*